Dec. 7, 1954  H. HERLACH  2,696,144
MOUNTING FOR AUTOMATIC GUNS
Filed Oct. 26, 1950  2 Sheets-Sheet 1

INVENTOR
Heinrich Herlach
BY
Richardy Geier
ATTORNEYS

Dec. 7, 1954  H. HERLACH  2,696,144
MOUNTING FOR AUTOMATIC GUNS
Filed Oct. 26, 1950  2 Sheets-Sheet 2
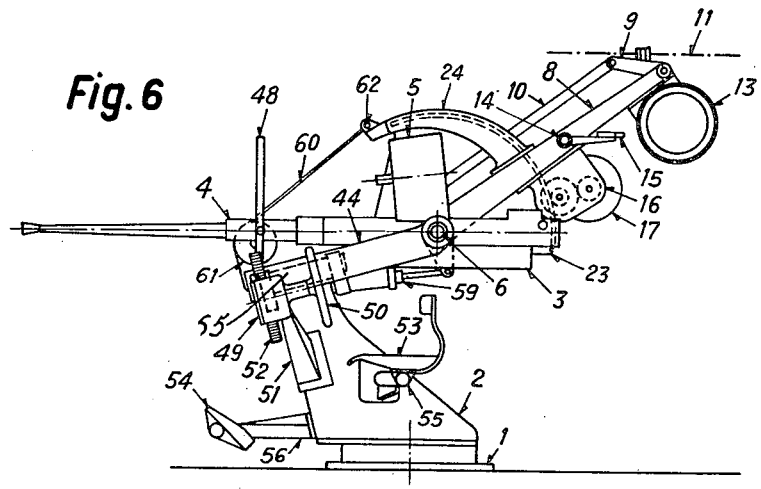
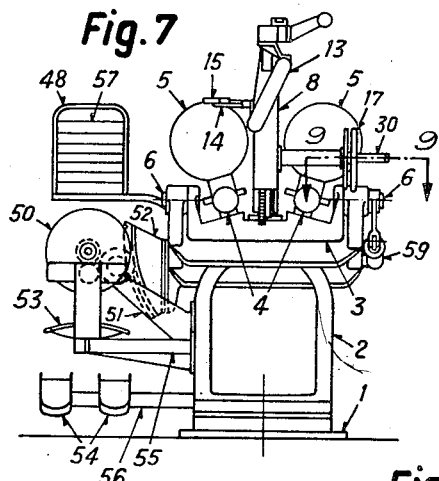
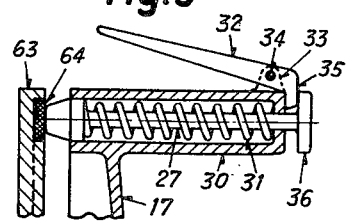
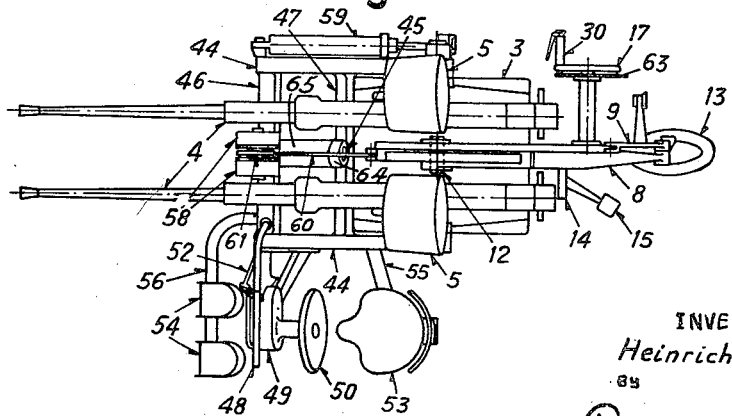
INVENTOR:
Heinrich Herlach
BY
Richard (signature)
ATTORNEYS United States Patent Office 2,696,144
Patented Dec. 7, 1954

2,696,144

MOUNTING FOR AUTOMATIC GUNS

Heinrich Herlach, Zurich, Switzerland, assignor to Machine Tool Works Oerlikon Administration Company, Zurich-Oerlikon, Switzerland, a company of Switzerland Application October 26, 1950, Serial No. 192,217

7 Claims. (Cl. 89—41)

For fighting fast aircraft at low altitudes with automatic anti-aircraft guns high aiming speeds are required. Experience shows that high aiming speeds can best be achieved if the gun is aimed freely by the gunner without the use of an elevation or traverse gear. Known mountings for automatic guns which are built for free aiming possess the disadvantage that the shoulder rest used for aiming the gun executes a large travel during elevation. The gunner therefore comes frequently in uncomfortable positions and the usable range of elevation is unduly limited. It has been tried to eliminate this disadvantage or at least reduce it to a certain degree by providing a gear by means of which another member of the gun crew could adjust the trunnion height during aiming. This arrangement, however, results in considerable hindrance of the gunner by said crew member.

The present invention relates to a mounting which avoids these disadvantages. The mounting in accordance with the invention is traversed freely and comprises a movable parallelogram attached to the cradle and consisting of an aiming arm, a sight carrier and a rod, said aiming arm being connected to the cradle by means of a pin arranged coaxial to the trunnions and carrying a shoulder ring for the gunner, the parallelogram swingably mounted in such a way that itself and the axis of the sight connected to the sight carrier which is always kept parallel to the gun's axis are adjustable to the size of the body of the gunner and said aiming arm being provided with a lockable elevation gear acting upon a toothed arc connected to the cradle whereby on locking of the elevation gear the aiming arm is rigidly connected to the toothed arc and therefore to the cradle through the locked gears of the elevation gear so the gun can be aimed freely in elevation by moving the parallelogram by means of the shoulder ring.

The attached drawing shows two constructional examples of a mounting according to the present invention.

Figure 1:
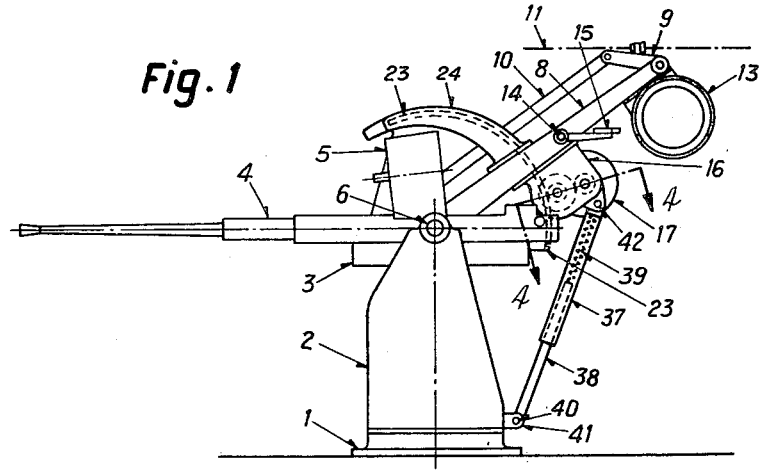
Fig. 1 is a side view of a first constructional example of the mounting.
Figure 2:
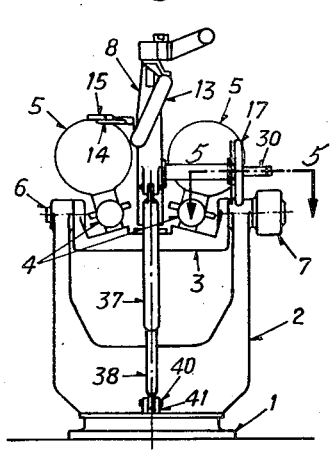
Fig. 2 is a rear view of the same mounting.
Figure 4:
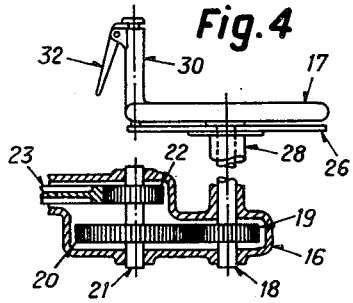
Figure 5:
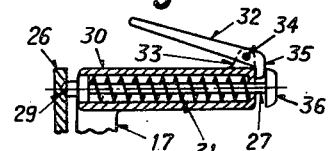
Figure 3:
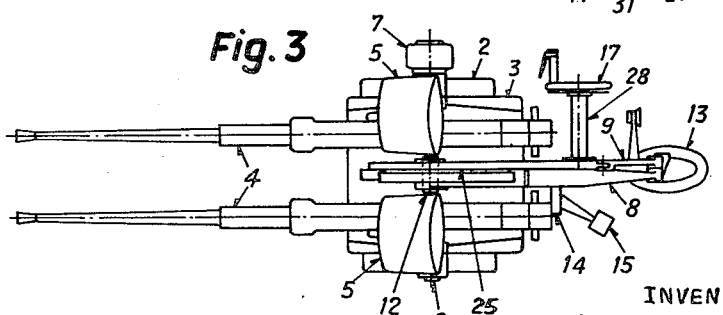
Fig. 3 is a plan view of the same mounting.

Fig. 4 is a section through the elevation gear along the line 4—4 in Fig. 1 to a larger scale, Fig. 5 is a section through the handle of the handwheel along the line 5—5 in Fig. 2 to a larger scale, Fig. 6 is a side view of a second constructional example of the mounting, Fig. 7 is a rear view of the same mounting, Fig. 8 is a plan view of the same mounting, Fig. 9 is a section through the handle of the handwheel along the line 9—9 in Fig. 7 to a larger scale.

The mounting shown in Figs. 1, 2, 5 is fitted with a fixed base plate 1 upon which the traverse carriage 2 is rotatably arranged. The cradle 3 carries two guns 4 with drum magazines 5 and is rotatably disposed in the traverse carriage 2 by means of the trunnions 6. The moment of cradle and guns is compensated by a spiral spring equalizer 7 of known design.

Aiming arm 8, sight carrier 9 and rod 10 constitute a movable parallelogram attached to the cradle 3, by means of which the axis of the sight 11, is always kept parallel to the gun's axis. The fourth side of the parallelogram is formed by a part of the cradle extending between the arm 8 and the rod 10. The aiming arm 8 is connected to the cradle by means of the pin 12 arranged coaxially with the trunnion 6. At its upper end the aiming arm 8 carries the shoulder ring 13. The handle 14 attached to the aiming arm 8 is fitted with a lever 15 which, when actuated by the lower arm of the gunner, operates the trigger of the guns via a linkage of known principle. The elevation gear contained in the housing 16 on the aiming arm 8 is actuated by means of the handwheel 17 (Fig. 4). The handwheel 17 drives via the shaft 18 the spur gear 19 meshing with the spur gear 20 splined on to the shaft 21. The movement of the shaft 21 is transmitted to the toothed arc 23 on the cradle 3 by means of the pinion 22. The toothed arc 23 is protected against damage and dirt by the casing 24. The toothed arc is provided with ground side faces 25 fitting exactly with corresponding faces on the aiming arm 8 and serving to improve the lateral support of the aiming arm 8.

The handwheel 17 is fitted with a lock device which consists of the disk 26 and the pin 27. The disk 26 is rigidly attached to the tube 28 and has a number of stop holes 29. The pin 27 movably arranged inside the handle 30 is pressed against the disk 26 by means of the spring 31 and is intended to engage the stop holes 29. The lever 32 is rotatably arranged on the portion 33 of the handle 30. It can rotate about the pin 34 and by its nose 35 engages the collar 36 of the pin 27 in such a way that upon actuation of the lever 32 the pin 27 is brought out of engagement with the stop holes 29 of the disk 26 against the action of the spring 31.

To compensate the weight of the aiming arm as well as the reactions arising from an angular acceleration of the cradle and the gun barrel during elevation or depression of the latter, an equalizer of known design is provided which consists of the sleeve 37, the piston 38 and the spring 39. The equalizer is attached to the portion 41 of the traverse carriage by means of the pin 40 and to the casing 16 by means of the pin 42.

During aiming the aiming arm 8 and thereby the parallelogram consisting of aiming arm 8, sight carrier 9 and rod 10 can be adjusted so the shoulder ring 13 and thereby the line of sight 11 will be in the most comfortable position for the gunner. The parallelogram is movable freely in the vertical plane so that it can be conveniently adjusted by the gunner depending upon his height. It should be noted that as far as the height of the shoulder ring 13 is concerned, a variation of the distance of the latter from a vertical plane through the trunnions 6 takes place, so that a tall gunner will be located closer to the gun than a shorter one. Traversing of the gun is free. Thus in operation, the gun can be elevated by means of the elevation gear operated by the gunner by the handle 17. When the lever 32 on the handle 30 is released, the elevation gear will be locked in any particular position by the pin 27. On locking of the elevation mechanism the aiming arm 8 is connected rigidly to the cradle 3. Therefore by means of the shoulder ring 13 the gun can also be aimed freely in elevation over a certain range. The position of this range can be chosen arbitrarily by operating the elevation gear.

The second constructional example of a mounting according to the present invention, as shown in Figs. 6 to 8, differs from the first example by the use of a third axis for compensating the ship's roll and by a different design of equalizer and handwheel lock.

The cradle, again designated by 3, with the guns 4 is arranged in a cradle carrier which is formed of two lateral pieces 44 and two cross members 46, 47 by means of the trunnions 6. A bearing 64 is attached to each of the two cross members 46, 47 and is engaged by an axle stub 45, which is located in front of a member 65 mounted upon the traverse carriage 2 and projecting between the bearings 64. The axis of rotation of the cradle carrier which is formed by the two axle stubs extends perpendicularly to the axis of the shield pivot and is slightly inclined to the horizontal, as shown in Fig. 6. Tilting of the cradle carrier is effected by means of a compensator gear of known design disposed inside the casing 49. The compensator gear is actuated by means of the handwheel 50 and engages the toothed arc 52 connected to the cradle carrier 44. The casing 49 is attached to the traverse carriage 2 by means of the carrier 51. The handwheel 50 is operated by a second gun crew member for whom a seat 53 and foot rests 54 are provided. The seat 53 and the foot rests 54 are connected to the traverse carriage 2 by means of the carriers 55, 56. A frame 48 with horizontal rods 57 which is fastened to the cross member 46 facilitates correct tilting.

To compensate the moment of cradle 3 and guns 4 an equalizer 59 of known design is arranged on the cradle carrier 44. The equalizer for the parallelogram consisting of aiming arm 8, sight carrier 9 and rod 10 possesses two spiral springs 58 the casings of which are attached to the cross member 46. The springs act upon a cam 61 from which a chain 60 is payed off. The other end of the chain is connected to the front end of the casing 24 by means of a pin 62.

The locking mechanism of the elevation handwheel 17 as shown in Fig. 9 is again fitted with a pin 27 which is subjected to the pressure of a spring 31 and can be withdrawn by means of the lever 32 rotatably disposed on the handle 30. The pin 27 is pressed against the fixed disk 63 by means of the spring 31. The disk 63 is fitted with a brake lining 64. The pin 27 bearing against the brake lining 64 locks the elevation handwheel. In all other respects the hand wheel 17 is operated by the gunner in the previously described manner.

The two constructional examples described previously are, of course, only two out of many possibilities for practical realization of the inventive thought.

I claim:
1. Mounting for automatic freely traversed guns, comprising trunnions, a cradle pivoted on said trunnions, a gun barrel supported by said cradle, an aiming arm pivoted on said cradle for pivotal movement about the axis of said trunnions, a connecting rod pivoted on said cradle to pivot about an axis parallel to the axis of said trunnions and disposed at a distance from said trunnions, a sight carrier hinged to said aiming arm and to said connecting rod; said cradle, said aiming arm, said connecting rod and said sight carrier forming a hinged parallelogram maintaining said sight in fixed angular relation with respect to the axis of said gun barrel; a toothed arc fixed on said cradle, and a lockable elevating gear supported by said aiming arm and adapted to cooperate with said toothed arc, whereby upon locking the elevation gear the aiming arm is rigidly connected to the toothed arc and therefore to the cradle through the locked gears of the elevation gear, whereby the gun can be aimed freely in elevation by moving the parallelogram by means of the aiming arm.

2. Mounting in accordance with claim 1, comprising an equalizer adapted to compensate for the unbalance of said cradle and said barrel, and a further equalizer for compensating the weight of parallelogram and elevation gear, said further equalizer being independent of the first mentioned equalizer of the cradle.

3. Mounting in accordance with claim 1, in which said aiming arm embraces the toothed arc of the cradle, the toothed arc and aiming arm having on both sides mating faces to effect better lateral support of the aiming arm.

4. Mounting in accordance with claim 1, comprising a traverse carriage and a cradle carrier, said cradle carrier being pivoted on said traverse carriage for rotation about an axis extending at right angles to the axis of said trunnions and obliquely to the vertical, and further comprising means for tilting said cradle carrier with respect to said traverse carriage.

5. Mounting in accordance with claim 1, comprising a traverse carriage, a further gear attached to said traverse carriage and a handwheel connected with said gear, said gear engaging a toothed arc and effecting the tilting of the upper part of the mounting.

6. Mounting in accordance with claim 1, comprising a handwheel for operating said elevating gear, a fixed disk arranged at the handwheel for locking of the elevation gear, said disk having stop holes formed therein, a pin arranged movably inside the handwheel handle engaging said holes, a spring, said pin being subjected to the action of said spring, a lever rotatably arranged on the handwheel handle, said pin being retractable from engagement with said stop holes of the disk by means of said lever.

7. Mounting in accordance with claim 1, comprising a handwheel for operating said elevating gear, a fixed disk arranged at the handwheel for locking of the elevation gear, said disk comprising a brake lining, a pin movably arranged inside the handwheel handle, a spring pressing said pin against said brake lining and a lever movably arranged on the handwheel handle, said pin being retractable by said lever.

References Cited in the file of this patent

UNITED STATES PATENTS

| Number | Name | Date |
|---|---|---|
| 1,556,478 | Benet | Oct. 6, 1925 |
| 1,700,902 | Prieur | Feb. 5, 1929 |
| 2,012,274 | Goebert et al. | Aug. 27, 1935 |
| 2,366,642 | Motley | Jan. 2, 1945 |
| 2,452,147 | Reinhold et al. | Oct. 26, 1948 |

FOREIGN PATENTS

| Number | Country | Date |
|---|---|---|
| 615,420 | France | Oct. 11, 1926 |
| 814,040 | France | Mar. 8, 1937 |
| 895,869 | France | Apr. 17, 1944 |
| 231,084 | Switzerland | May 16, 1944 |
| 232,644 | Switzerland | Sept. 1, 1944 |